United States Patent Office 3,790,555
Patented Feb. 5, 1974

3,790,555
OCTAPEPTIDE DERIVATIVE OF GONADOTROPIN-RELEASING HORMONE
George Rogelio Flouret, Waukegan, and John Wayne Cole, Deerfield, Ill., assignors to Abbott Laboratories, North Chicago, Ill.
No Drawing. Filed Jan. 20, 1972, Ser. No. 219,567
Int. Cl. C07c *103/52;* C07g *7/00;* C08h *1/00*
U.S. Cl. 260—112.5                                        8 Claims

ABSTRACT OF THE DISCLOSURE

The synthesis of the octapeptide Trp-Ser-Tyr-Gly-Leu-Arg-Pro-Gly-amide carrying easily removable protective groups on the Ser, Tyr, Arg and Trp moieties is described. The new synthesis uses as the starting material two tetrapeptide fragments carrying easily removable protective groups. One of these fragments, Trp-Ser-Tyr-Gly-OH with suitable protective groups, also is a part of the present invention. After coupling of the two fragments, the protective group on the amino-N of the tryptophane moiety is removed to obtain an octapeptide carrying easily removable protective groups which can be retained while building up the molecule to the decapeptide chain which is the gonadotropin-releasing hormone, after removal of these protective groups.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, small doses of this Gn-RH administered by intravenous injections to female sheep in the anestrus cycle produces ovulation. The formula of the Gn-RH has been identified with the amino acid sequence of pyro-Glu-His-Trp-Ser-Tyr-Gly-Leu-Arg-Pro-Gly-NH$_2$ but in order to make such a large molecule from simple, single aminoacids, a considerable number of steps including several condensation reactions are required. In order to assure such condensations to take place at the desired sites, other active sites or functional groups on the molecule usually must be protected by some groups that can be removed at will.

A relatively simple method has now been devised to produce the desired aminoacid chain from two tetrapeptide fragments. The new method involves a minimum of group-protecting and removal reactions for such protective groups and has the advantage of using soluble intermediate tetrapeptide which can be coupled in a simple, single-step process that does not cause racemization. This is a very important aspect of the present invention because Gn-RH consists of only L-amino acids and racemization must be avoided in each step of the synthesis for Gn-RH to prevent the latter from being diluted with inactive material. Therefore, for the purpose of the present disclosure, it is to be understood that all aminoacids used herein are in their optically active L-form except for glycine.

The present invention is particularly concerned with a practical method for making the octapeptide which is one of the precursors for Gn-RH and carries protective groups on the active sites of the serine, tyrosine and arginine fragments that can be removed by simple methods substantially without affecting the aminoacid links. It is another object of the present invention to provide a process for the preparation of a protected octapeptide that may be used directly for making the corresponding nonapeptide which is a direct precursor to Gn-RH. It is a further object of this invention to provide a poly-protected tetrapeptide that can be used without adding further protective groups as an intermediate to make the correspondingly protected octapeptide. It is still another object of the present invention to provide a method for making a protected octapeptide in which the protective groups can be removed to provide the free, unprotected octapeptide.

These and other objects are accomplished by providing a process for making

Y-Trp-(O-R)Ser-(O-R')Tyr-Gly-
Leu-(N$^\omega$-R'')Arg-Pro-Gly-NH$_2$     (I)

wherein R, R', R'' and Y are protective groups that are removable by a simple chemical treatment that does not affect the amide bonds, consisting essentially in coupling Y-Trp-(O-R)Ser-(O-R')Tyr-Gly-OH     (II)

with

Leu-(N$^\omega$-R'')Arg-Pro-Gly-NH$_2$     (III)

in an inert solvent or solvent mixture in the presence of an inert solvent and a carboxyl activating agent at a temperature of between 0 and 30° C. for a period of several hours. In a preferred embodiment, the reactants are used in equimolar amounts; however, either the tetrapeptide of Formula II or that of Formula III may be used in an excess of up to 50% above the equimolar amount. The carboxyl activating agent is used in slight excess over the equimolar amount of the amount of tetrapeptide of Formula II; dicyclohexylcarbodiimide, pyridyl disulfide or triphenylphosphine. Alternatively, the carboxyl group may be activated as an anhydride, or by the presence of p-nitrophenyl ester, trichlorophenylester, or as the acyl azide and analogous methods as described by Schroder and Luebke "The Peptides" (Academic Press), vol I, page 76 ff. (1965); or by means of ethyl 2-ethoxy-1,2-dihydroquinoline-N-carboxylate (EEDQ reagent) as described by Bellean and Malek, J. Am. Chem. Soc., 90, 165 (1968), or by a mixture of 2,2'-dipyridyldisulfide and triphenylphosphine as described by Mukaiyanna, Matzueda Suzuki, T. Letters 1970, page 1901.

In the above tetrapeptide fragments, R ordinarily is represented by tetrahydropyranyl, tert.-butyl, acetyl, benzyloxycarbonyl or benzyl (Bzl); R' is tetrahydropyranyl, tert.-butyl, acetyl, benzyloxycarbonyl (BOC), benzyl, triphenylmethyl or tosyl and R'' is nitro, tosyl, benzyloxycarbonyl, p-nitrobenzyloxycarbonyl or tetrachloroisopropyloxyphthaloyl which is used to substitute one of the hydrogen atoms in the amino group of the guanidine moiety in Arg; Y is hydrogen, tert.-butoxycarbonyl, o-nitrophenylsulfenyl, 2-(diphenyl)isopropyloxycarbonyl, benzyloxycarbonyl or phthalyl.

The protected tetrapeptide of Formula II is prepared by coupling BOC-(O-Bzl)Tyr o-nitrophenyl ester with glycine methyl ester and the resulting BOC-(O-Bzl)Tyr-Gly-OCH$_3$ is deprotected at N$^\alpha$-position by treatment with HCl followed by treatment with a basic resin. By coupling the obtained (O-Bzl)Tyr-Gly-OCH$_3$ with BOC-(O-Bzl)Ser-OH, BOC-(O-Bzl)Ser-(O-Bzl)Tyr-Gly-OCH$_3$ is obtained from which the tert.-butoxycarbonyl group is again removed by treatment with HCl and a basic resin. The resulting tripeptide is coupled with BOC-Trp-OH and the ensuing tetrapeptide is saponified with dilute sodium hydroxide to give the triprotected tetrapeptide BOC-Trp-(O-Bzl)Ser-(O-Bzl)Tyr-Gly-OH.

The other tetrapeptide required in the new synthesis for the above octapeptide, the Leu-(N$^\omega$-R'')Arg-Pro-Gly-NH$_2$ is prepared as follows: N-benzyloxycarbonyl-proline p-nitrophenyl ester is reacted with equimolar amount of glycinamide and the obtained N-benzyloxycarbonylprolyl-glycinamide is converted to the unprotected dipeptide by hydrogenation or acid treatment. The prolylglycinamide is then reacted with $N^\alpha$-benzyloxycarbonyl-$N^\omega$-nitroarginine to form a twice protected tripeptide from which the benzyloxycarbonyl group is removed by acid treatment to furnish $N^\omega$-nitroarginyl-prolylglycinamide, which is simply referred to as ($N^\omega$-$NO_2$)Arg-Pro-Gly-$NH_2$. The latter is reacted with N-tert.-butyloxycarbonyl-leucine p-nitrophenyl ester to produce a twice protected tetrapeptide from which the tert.-butyloxycarbonyl group is removed by treatment with an acid to yield Leu-($N^\omega$-$NO_2$)Arg-Pro-Gly-$NH_2$.

The protective group Y can be removed by conventional methods to produce the octapeptide carrying protective groups R, R' and R''. This tri-protected octapeptide (Formula I; Y is hydrogen) can be converted to the similarly protected (R, R' and R'' are the same as above) decapeptide by reacting it first with $N^{Im}$-protected (or unprotected) histidine carrying an $N^\alpha$-protective group and after removing the latter, reacting the formed nonapeptide with pyroglutamic acid pentachlorophenyl ester. The free decapeptide (or Gn-RH) can be obtained by treating the protected decapeptide with hydrogen fluoride. During this reaction, the protective groups R, R' and R'' all are removed and replaced by hydrogen. Alternately, by proper selection of the protective groups they can be removed by hydrogenation using a palladium catalyst.

In a more specific embodiment, the above-named protected tetrapeptide of Formula II wherein R and R' are benzyl and Y is the BOC group is coupled with tetrapeptide of Formula III wherein R'' is $NO_2$ in methylene chloride at a concentration of between 5–20 ml. per millimole and a 0–50% excess over molarity of dicyclohexylcarbodiimide at a temperature between 0 and 30° C. and in the presence of 1–20 times the molar equivalent of pyridine as a co-solvent. After several hours, the reaction solution is evaporated and the residue is dissolved in 15% methanol/chloroform and the solution is placed on a silica gel column. The column is eluted with chloroform containing increasing amounts of methanol until the desired octapeptide appears in the eluate. The desired fractions of eluate are then combined and crystallized.

In order to prepare Gn-RH from the above material, the protective group Y is removed from the Trp moiety by any of the suitable methods known in the peptide art and the resulting tri-protected octapeptide is condensed with $N^\alpha$-tert.-butyloxycarbonylhistidine or a similarly $N^\alpha$-protected histidine, the $N^\alpha$-protecting group is removed and the formed nonapeptide reacted with pyroglutamic acid pentachlorophenyl ester. The resulting tri-protected decapeptide is then dissolved in an inert solvent and placed in a HF-resistant reaction vessel and treated there at a temperature between 0° and 30° C. with excess hydrogen fluoride. The excess hydrogen fluoride is removed after about one hour, the solvent is removed and the product is dried and purified. The Gn-RH prepared in this manner is highly active in biological tests showing luteinizing hormone-releasing activity in warm-blood animals.

All of the condensations discussed above for the preparation of the compounds of Formulae II and III are carried out in the presence of an inert solvent such as dimethylacetamide or dimethylformamide or other organic liquids that do not react with either of the starting materials or the products of each step. Of course, it is to be understood that the above reaction sequence may be followed without using the specific protective groups named in each of the described stages. For instance, the benzyl groups used to protect the free hydroxy groups in serine or tyrosine may be replaced by tetrahydropyranyl, tert.-butyl, acetyl, trifluoroacetyl, benzyloxycarbonyl and in the case of tyrosine also with triphenylmethyl or tosyl; the nitro group protecting the amino group in the guanidine moiety of arginine may be replaced by converting the amino group to an amide or half-amide with a sulfonic or a carboxylic acid, e.g., tosyl, benzyloxycarbonyl or tetrachloroisopropyloxyphthaloyl. In all instances, the protective groups, of course, should be chosen in such a way that they can easily be removed by one or more simple treatments which are mild enough as not to affect the aminoacid chain bonds. This is the case with all above mentioned protective groups and also includes the p-nitro-, p-methyl- and p-methoxy substituted derivatives of the listed groups containing a benzyl moiety.

If desired, the protective groups may be removed stepwise; for instance, where R and R' are the usual benzyl or substituted benzyl ethers, these groups may be removed by hydrogenation and subsequently, the protective group on the arginyl fragment can be removed by a suitable reaction step that does not affect the aminoacid links. Of course, such a reaction sequence may be reversed, if desired.

In order to show the preparation of the above octapeptide, reference is made to the following examples which are to be understood as illustrations only and are not to be construed to limit the invention in any respect.

Example 1

To a stirred mixture of 1.26 g. of glycine methyl ester hydrochloride, 20 ml. of methylene dichloride and 1.0 g. of triethylamine at 10° C. was added a solution of 3.8 g. of tert.-butoxycarbonyl-O-benzyl-tyrosine p-nitrophenyl ester in 20 ml. of methylene chloride. Stirring was continued for one hour at 10° C. and then for 39 hours at room temperature. Evaporation of the solvent left a residue which was dissolved in ethyl acetate and then washed in a separation funnel in turn with water, 10% aqueous citric acid, water, 2% aqueous sodium bicarbonate and water. The ethyl acetate solution was concentrated in vacuo to a residue, which was crystallized from anhydrous ether giving a first crop of 2.30 g. of white crystals, M.P. 119–120° C. and a second crop of 0.41 g. of white crystals, M.P. 118–119° C. The filtrate was then treated with 2 g. of a basic resin (Rexyn 201 marketed by Fischer Scientific Co.) 20 ml. of methanol/ether 1:1 to remove the p-nitrophenol by-product and give a new filtrate which, upon concentration, deposited a third crop of white needles weighing 0.37 g., M.P. 120° C. The total yield of crystalline BOC-(O-Bzl)Tyr-Gly-$OCH_3$ amounted to 3.07 g. or 90% of the theoretical amount based on the tyrosine ester used.

The three crops were found to be homogeneous by TLC analysis. A vacuum dried sample, M.P. 120° C. was analyzed and confirmed the formula $C_{24}H_{30}N_2O_6$ assigned to this compound. The optical rotation was $[\alpha]_D^{24°} = -7°$ (DMF).

A sample of the above product upon hydrolysis with an aqueous methanol solution of one equivalent of sodium hydroxide at room temperature for 3 hours and subsequent acidification gave a sample of BOC-(O-Bzl)Tyr-Gly-OH of formula $C_{23}H_{28}N_2O_6$ which crystallized from ethyl acetate plus anhydrous ether as white crystals, M.P. 151–152°. This also gives a correct C, H and N analysis.

Example 2

In a modification of Example 1, glycine benzyl ester was used in place of the above glycine methyl ester hydrochloride, yielding the corresponding benzyl ester BOC-(O-Bzl)Tyr-Gly-OBzl of the formula $C_{30}H_{34}N_2O_6$ which was obtained as a waxy amorphous solid. This product upon ester exchange with anhydrous methanol and a basic resin produced the methyl ester, M.P. 119–120° C. described in Example 1.

Example 3

A mixture of 2.08 g. of the compound of Example 1 and 18 ml. of 4 molar hydrochloric acid in anhydrous dioxane at room temperature was stirred for 40 minutes.

After evaporating the mixture, the residue was taken up in 5 ml. of anhydrous ether and the mixture was evaporated in vacuo. The residue was dissolved in 25 ml. of anhydrous methanol and treated with 12 g. (about 3 times the theoretical amount) of a basic resin (Fischer Scientific, Rexyn 201) to remove the hydrochloric acid. The filtrate was concentrated to yield 1.8 g. of crude amorphous, solid (O-Bzl)Tyr-Gly-OCH$_3$. Since this material gave the expected pattern on TLC, it was used directly for the next step.

Example 4

A mixture of 1.8 g. of the amorphous (O-Bzl)tyrosyl glycine methyl ester of Example 3, 1.18 g. of BOC-(O-Bzl)Ser-OH and 15 ml. of methylene chloride was stirred and cooled to 5° C. To this mixture was added 0.87 g. of dicyclohexylcarbodiimide, which was rinsed into the reaction mixture with 3 ml. of methylene chloride. The mixture was stirred in the cold for 30 minutes and for 16 hours at room temperature. The resulting mixture was filtered to remove crystalline dicyclohexylurea by-product and the filtrate plus methylene chloride washings was transferred to a separatory funnel and washed as described in Example 1. The resulting methylene chloride solution was decanted and evaporated in vacuo to a residue which dried in vacuo to a white solid froth. This material was crystallized from methanol/anhydrous ether 1:1 to give a first crop of 1.40 g., M.P. 127–128° C. and a second crop of 0.89 g., M.P. 121–125° C.

These crops were equivalent in TLC analysis. A sample, melting at 127–128° C. after drying in vacuo, gave the correct C, H and N analysis for BOC(O-Bzl)Ser-(O-Bzl)Tyr-Gly-OCH$_3$ of formula C$_{34}$H$_{41}$N$_3$O$_8$.

The corresponding benzyl ester, BOC-(O-Bzl)Ser-(O-Bzl)-Tyr-Gly-OBzl was prepared in the same way as shown above, using BOC-(O-Bzl)Ser-OH and (O-Bzl)Tyr-Gly-OBzl as starting materials. It melts at about 78° C. (variable with rate of heating), shows [α]$_D$ —15° (DMF) and analyzed correctly for C$_{40}$H$_{45}$N$_3$O$_8$.

The free acid made from the above esters was obtained as an amorphous product.

Example 5

In a round bottom flask a mixture of 1.24 g. of BOC-(O-Bzl)Ser-(O-Bzl)Tyr-Gly-OCH$_3$ and 15 ml. of 4 molar hydrochloric acid in anhydrous dioxane was swirled to a clear solution and kept at room temperature for 40 minutes at which time it was evaporated in vacuo. The residue was dissolved in methanol and the solution was again evaporated in vacuo to yield a white crystalline layer of the hydrochloride of (O-Bzl)Ser-(O-Bzl)Tyr-Gly-OCH$_3$. This was identified only by TLC analysis. The whole product was dissolved in methanol and treated with 6 g. of a basic resin (Rexyn 201) and the filtrate was evaporated to yield 1.043 g. of the amorphous basic ester (O-Bzl)Ser-(O-Bzl)Tyr-Gly-OCH$_3$ analyzing correctly for C$_{29}$H$_{33}$N$_3$O$_6$. The material gave the expected low-R$_f$ TLC pattern and a positive ninhydrin color test.

Example 6

A mixture of 1.04 g. of the ester of Example 5, 0.544 g. of BOC-tryptophane and 9 ml. of methylene chloride at 0° C. was stirred while 0.45 g. of dicyclohexylcarbodiimide was added. This mixture was stirred without cooling for 16 hours. The resulting mixture was filtered to remove solid dicyclohexylurea by-product which was washed with methylene chloride. The filtrate was transferred to a separatory funnel. The methylene chloride solution was washed as described in Example 1, and subsequently evaporated in vacuo to give a residue of the crude product. TLC analysis showed this residue to be rich in the desired BOC-Trp-(O-Bzl)Ser-(O-Bzl)Tyr-Gly-OCH$_3$; R$_f$=0.5 (in 98% CHCl$_3$-2% MeOH) but not clean enough to use.

The product mixture was recrystallized by dissolving it in 10 ml. of hot methanol, concentrating the solution to about half its volume and cooling it very slowly. The first crop amounted to 1.12 g. of crystals, M.P. 168–170° C. The crude second crop was recrystallized separately to obtain 0.17 g. of crystals M.P. 168–170°. Additional product was still present in the filtrate. The useful yield was 88% of theory. An analytical sample obtained by one additional recrystallization and vacuum drying gave pure product, M.P. 172° C., [α]$_D$ —15° (DMF) and showed the correct analysis for C$_{45}$H$_{51}$N$_5$O$_9$.

Example 7

A solution of 0.4 g. of BOC-Trp-(O-Bzl)Ser-(O-Bzl)Tyr-Gly-OCH$_3$ in 2 ml. of methylene chloride plus 4 ml. of methanol was concentrated to about 3.5 ml. of methanolic solution. This is a supersaturated solution. While swirling at room temperature, 0.5 ml. of water and 0.50 ml. of 1 N sodium hydroxide solution was added. The turbid mixture was stirred at room temperature for one hour. Vacuum concentration without heating followed by shaking the residue with a 10% aqueous citric acid solution gave a solid product which was collected on a filter and washed with aqueous citric acid, water and several times with anhydrous ether. Evaporation gave 0.34 g. of the product, M.P. about 120–125° C. By TLC methods, it was shown that this represented a mixture of the desired acid Trp-(O-Bzl)Ser-(O-Bzl)Tyr-Gly and the starting material ester.

Separation was effected by chromatography on a silica column conditioned with 2% methanolic methylene chloride. Elution was started with the same solvent with gradual increase from 2% methanol to 15%. The early fraction gave 0.096 g. of recovered methyl ester while later fractions gave 0.22 g. of the crystalline acid. The acid was recrystallized from methanol and anhydrous ether to obtain 0.204 g. of a white crystalline powder, M.P. 133–135° C.; [α]$_D$ —14.7° (DMF).

A comparison of the NMR spectra of the methyl ester (BOC-Trp-(O-Bzl)Ser-(O-Bzl)Tyr-Gly-OCH$_3$) and the acid (BOC-Trp(O-Bzl)Ser-(O-Bzl)Tyr-Gly-OH) in deuteromethanol solutions shows the difference to be essentially only the methyl ester peak at 222 Hz. (TMS; 60 mHz.) of the ester sample.

EXAMPLE 8

A solution of 0.126 g. of the basic peptide Leu-(NO$_2$)Arg-Pro-Gly-NH$_2$ in 0.5 ml. of methylene chloride containing 0.5 ml. of pyridine was mixed with a suspension of 0.198 g. of the acid BOC-Trp-(O-Bzl)Ser-(O-Bzl)Try-Gly-OH in 1 ml. of methylene chloride. This mixture was stirred at 20° C. while 62 mg. of dicyclohexylcarbodiimide was added with 2 ml. of methylene chloride. Stirring at room temperature for 20 minutes gave a nearly clear solution. After stirring for 16 hours, a TLC study of a sample indicated that both, product and starting materials, were present. Stirring was continued to a total of 40 hours. The mixture was then evaporated and the residue was dissolved in 5 ml. of a solvent mixture of 15% methanolic methylene chloride and put onto a chromatographic column containing 20 g. of silica gel. Elution was done with the same solvent mixture. Early fractions gave dicyclohexylurea; subsequent fractions gave 0.058 g. of crude octapeptide, identified by TLC methods and later fractions contained 0.18 g. of by-product peptides, from which a small amount of the starting material acid was recovered. No basic tetrapeptide was found.

The 0.058 g. of crude product (18% yield) was purified further by chromatography and crystallization from methanol to obtain the purified octapeptide amide BOC-Trp-(O-Bzl)Ser-(O-Bzl) - Tyr-Gly-Leu - (N$^\omega$-NO$_2$)Arg-Pro-Gly-NH$_2$ as white crystals, M.P. 144–147° C. and a small amount of crude material. The desired amide is identical in all physical and chemical characteristics with the octapeptide made by step-wise addition of each individual aminoacid.

When in the above example the amount of the basic peptide is increased to 0.17 g., the reactions appear to proceed faster but the ensuing product mixture contains more by-products and is more difficult to purify. If the amount of the above tri-protected tetrapeptide acid is increased to 0.29 g., the reaction proceeds more slowly but the resulting product mixture is easier to work-up.

The step of combining the two tetrapeptides into an octapeptide requires the use of an inert solvent or solvent mixture. The term "inert" is used to express that the solvent does not react or adversely affect the two tetrapeptide fractions or the octapeptide and the dicyclohexylcarbodiimide. A preferred solvent is methylene chloride but unfortunately the starting materials are not sufficiently soluble therein. By adding pyridine to the methylene chloride, the starting materials become more soluble so that with a 1:1 ratio of these solvents, the reaction can be carried out in a concentration of 5–20% (w./v.). The ratio between methylene chloride and pyridine can be varied between 2:1 and 1:2 on a volume basis to provide sufficient solubility for the reactants to produce an adequate reaction speed at a suitable concentration. Usually a reaction time between 1 and 20 hours at temperatures between 0 and 30° produces an acceptable yield, particularly when the two tetrapeptides are used in equimolar amounts.

The resulting octapeptide can be deblocked on the tryptophan moiety to produce the starting material directly capable for making the nonapeptide which, in turn, is the starting material for making protective Gn-RH. The deblocking reaction for the octapeptide is preferably analogous to the reaction described in Example 5 which shows the procedure in which the N-protective group is removed without affecting the protecting groups in other sections of the molecule. The octapeptide could also be completely deprotected and the free octapeptide may be used for conversion to Gn-RH by using the above reaction sequence.

We claim:

1. The protected tetrapeptide Y-L-Trp-L-(O-R)Sec-L-(O-R')Tyr-Gly-R" wherein R, R' and Y are protective groups which can easily be removed by a chemical treatment that does not affect the peptide chain and does not cause racemization and wherein R" is OH or $NH_2$.

2. A tetrapeptide of claim 1 wherein R and R' both are the benzyl moiety.

3. The tetrapeptide of claim 2 wherein Y is benzyloxycarbonyl and R" is OH.

4. The tetrapeptide of claim 2 wherein Y is benzyloxycarbonyl and R" is $NH_2$.

5. The proecss of making an octapeptide of the formula Y-L-Trp-L-(O-R)Sec - L - (O-R')Tyr-Gly-L-Leu-L-($N^\alpha$-R")Arg-L-Pro-Gly-$NH_2$ wherein Y, R, R' and R" are protective groups that can be removed by a chemical treatment that does not affect the peptide chain, and does not cause racemization, comprising reacting the tetrapeptide acid Y-L-Trp-L-(O-R)Ser-L-(O-R')Tyr-Gly-OH with the tetrapeptide L-Leu-L-($N^\alpha$-R)Arg-L-Pro-Gly-$NH_2$ wherein Y, R, R' and R" have the above meaning for several hours at a temperature of between 0° and 30° C. in the presence of an inert solvent or solvent mixture and in the presence of an equimolar amount of carboxylic activating agent based on the amount of said tetrapeptide acid.

6. The process of claim 5 wherein said carboxylic activating agent is dicyclohexylcarbodiimide.

7. The process of claim 5 wherein said tetrapeptide and said tetrapeptide acid are used in a molar ratio between 2:1 and 1:2.

8. The process of claim 5 wherein said inert solvent is a mixture of methylene chloride and pyridine in a volume ratio between 2:1 and 1:2.

References Cited

Geiger et al.: Biochem. Biophys. Res. Comm., 45, 767 (1971).

LEWIS GOTTS, Primary Examiner

R. J. SUYAT, Assistant Examiner